(12) United States Patent
Willard

(10) Patent No.: US 10,934,134 B2
(45) Date of Patent: Mar. 2, 2021

(54) STORAGE ADAPTER SYSTEM FOR HITCH-MOUNTED CARRIER

(71) Applicant: Mark Willard, Saratoga Springs, UT (US)

(72) Inventor: Mark Willard, Saratoga Springs, UT (US)

( * ) Notice: Subject to any disclaimer, the term of this patent is extended or adjusted under 35 U.S.C. 154(b) by 0 days.

(21) Appl. No.: 15/887,658

(22) Filed: Feb. 2, 2018

(65) Prior Publication Data
US 2019/0241414 A1    Aug. 8, 2019

(51) Int. Cl.
| | | |
|---|---|---|
| *B66D 1/22* | (2006.01) | |
| *B66B 9/00* | (2006.01) | |
| *B66D 1/12* | (2006.01) | |
| *B66C 1/22* | (2006.01) | |
| *B66F 7/28* | (2006.01) | |
| *B60R 9/06* | (2006.01) | |
| *B60R 9/10* | (2006.01) | |

(52) U.S. Cl.
CPC .................. *B66B 9/00* (2013.01); *B66C 1/22* (2013.01); *B66D 1/12* (2013.01); *B60R 9/06* (2013.01); *B60R 9/10* (2013.01); *B66F 7/28* (2013.01)

(58) Field of Classification Search
CPC ..... B66F 7/28; B60R 9/06; B60R 9/10; B66C 1/22; B66D 1/12; B60P 1/4421; B60P 3/06; B60P 3/07; B60P 3/122; B60P 3/125; Y10S 224/924
USPC ........................ 187/259; 211/94.01; 414/462
See application file for complete search history.

(56) References Cited

U.S. PATENT DOCUMENTS

| | | | | |
|---|---|---|---|---|
| 3,907,113 A | * | 9/1975 | Kropelnitski ............ | B62H 3/12 211/19 |
| 4,600,177 A | * | 7/1986 | Fritz ........................ | B60J 7/106 254/338 |
| 5,143,182 A | * | 9/1992 | Basta ........................ | B63C 3/06 114/44 |
| 5,183,162 A | * | 2/1993 | Ritzenthaler ............ | B62H 3/12 211/1.57 |
| 5,188,323 A | * | 2/1993 | David ................. | A61M 5/1415 248/125.1 |
| 5,221,009 A | * | 6/1993 | Ritzenthaler ............ | B62H 3/12 211/18 |
| 5,595,265 A | * | 1/1997 | Lebrocquy ............ | A01M 31/02 187/244 |
| 5,645,388 A | * | 7/1997 | Lacasse .................. | B64F 1/222 187/203 |
| 5,984,613 A | * | 11/1999 | Motilewa .................. | B60R 9/06 224/519 |
| 6,007,290 A | * | 12/1999 | Schulz ...................... | B60R 9/06 414/462 |
| 6,640,934 B1 | * | 11/2003 | Edwards .................. | B66B 9/00 182/141 |
| 6,663,133 B1 | * | 12/2003 | Rosenlund ............... | B60D 1/06 280/490.1 |

(Continued)

*Primary Examiner* — Gregory W Adams
(74) *Attorney, Agent, or Firm* — Strong & Hanni, PC; Joseph Shapiro

(57) ABSTRACT

A method and system for storing items using a hitch adapter secured to a trolley that moves along a vertically oriented track is disclosed. In one embodiment, a winch raises and lowers the trolley and hitch adapter by retracting and deploying a cable that is secured to the trolley. A bicycle carrier may be secured to the hitch adapter for storing bicycles, and for raising bicycles when not in use.

1 Claim, 10 Drawing Sheets

(56) References Cited

U.S. PATENT DOCUMENTS

| | | | | |
|---|---|---|---|---|
| 6,676,233 B1* | 1/2004 | Evans | ................... | B66B 9/02 |
| | | | | 108/147.11 |
| 6,729,478 B1* | 5/2004 | Boers | ................... | B62H 3/12 |
| | | | | 211/18 |
| 6,824,156 B2* | 11/2004 | Smith | ................... | B60D 1/52 |
| | | | | 280/490.1 |
| 7,428,950 B2* | 9/2008 | del Rio | ................ | B66B 7/027 |
| | | | | 187/254 |
| 7,661,543 B1* | 2/2010 | Townsend | ............... | B60D 1/52 |
| | | | | 211/4 |
| 8,397,835 B1* | 3/2013 | Lyngaas | ............... | E21B 7/008 |
| | | | | 175/18 |
| 8,602,437 B1* | 12/2013 | Morris | ................. | B60R 9/10 |
| | | | | 280/402 |
| 8,875,844 B2* | 11/2014 | Janz | ..................... | B66F 7/28 |
| | | | | 187/244 |
| 9,127,509 B2* | 9/2015 | Robinson | ............ | E21B 7/027 |
| 9,216,698 B2* | 12/2015 | Rhodes | ................. | B60R 9/065 |
| 9,233,634 B1* | 1/2016 | Level | .................. | B60P 3/125 |
| 2007/0034760 A1* | 2/2007 | Moore | ................. | B62H 3/12 |
| | | | | 248/300 |
| 2008/0011698 A1* | 1/2008 | Simon | .................. | B60R 9/06 |
| | | | | 211/85.8 |
| 2008/0100076 A1* | 5/2008 | Potts | ................... | B60R 9/06 |
| | | | | 296/3 |
| 2010/0059466 A1* | 3/2010 | Tanner | ................ | A47B 51/00 |
| | | | | 211/134 |
| 2010/0096347 A1* | 4/2010 | Theobald | .............. | B60R 9/06 |
| | | | | 211/85.7 |

* cited by examiner

STORAGE ADAPTER SYSTEM FOR HITCH-MOUNTED CARRIER

BACKGROUND OF THE INVENTION

Bicycle enthusiasts frequently secure one or more bicycles to a vehicle for transportation to or from a riding location, or to transport one or more bicycles in general. For years cyclists, engineers, and others have been working on improved bicycle carriers for vehicles: more bicycles, greater versatility, stronger, smaller, lighter, more compact, increased configurability, increased ease of installation/un-installation, stronger mechanisms for securing bicycles, more convenient mechanisms for securing bicycles, improved locking mechanisms, allowing for opening of a trunk, tailgate, or hatchback even when the bicycle carrier is installed, etc.

This problem—how to secure items to a vehicle—is not unique to bicycles, but is relevant for virtually all vehicle storage and rack systems, which are designed to carry items ranging from coolers to cargo units to luggage to boats to kayaks to camping gear, and anything else that may be carried in, on, or otherwise secured to a carrier system for a vehicle.

One of the problems with carrier systems for vehicles is that the carrier systems often must be removed from the vehicle when not in use, and must be stored while not in use. Storing such carrier systems often means finding an out-of-the way place for the carrier system until the carrier system is needed on the vehicle again. While in storage, the carrier system takes up what is often limited storage space (e.g., space in a residential garage) and does not perform any beneficial function. In general, when the carrier system is removed from the vehicle, the items transported on the carrier system are stored separate from the carrier system.

One type of carrier system subject to the shortcomings described above is a hitch-mounted carrier system. Many types of hitches are well-known in the art. In general, the most frequently used hitch system comprises a hitch receiver secured to the underside of the rear of a vehicle, e.g., underneath a trunk, hatchback, or truck bed. A hitch receiver is generally a hollo square-shaped tube receiver configured to receive a ball mount. The hitch receiver is a female component, and the ball mount is a complementary male component (also usually a square tube) that slides inside the hitch receiver, and is generally secured to the hitch using a pin that goes through the sidewalk of both the hitch receiver and the ball mount. The end of the ball mount that protrudes out of the hitch receiver generally includes one or more balls for mounting a trailer or other apparatus. The balls may be a monolithic part of the ball mount or they may be remove-able and/or interchangeable. Interchangeable balls are generally secured to the ball mount using a bolt and nut, the bolt going through a hole in the ball mount and secured on the opposite side with a nut, and the bolt being monolithically connected to the ball (i.e., the bolt is part of the same component as the ball, often protruding from one side of the ball).

Many solutions and approaches are known and currently used for securing a carrier system to a hitch receiver and/or ball mount. Some carrier systems are secured directly to a hitch receiver. Other carrier systems are secured to a ball mount that is in turn secured to a hitch receiver. For example, some currently available bicycle carriers include, as an integral component, a male square tube that is complementary (e.g., in size and length) to a hitch receiver. This compos Writ may be referred to as a hitch adapter. The hitch adapter may be secured to a hitch receiver in the same manner that a ball mount may be secured to the hitch receiver, e.g., by inserting the male hitch adapter into the female hitch receiver and inserting a pin through holes in the sidewalls of the hitch receiver and hitch adapter.

As described above, this type of bicycle carder may be convenient when in use on a vehicle because it is sturdy, well-secured, and strong, and may allow for transporting up to four bicycles, and in some cases even more than four bicycles. Although convenient when mounted on a vehicle, this type of bicycle carrier becomes an inconvenience when not being used on a vehicle. The bicycle carrier (or other type of carrier that may be secured to a vehicle using a hitch receiver, ball mount, and/or hitch adapter) must be stored and in such storage it occupies space without providing any benefit other than accessibility for future use to transport bicycles on a vehicle. Also, such bicycle carriers may be heavy and unwieldy in shape or weighting, thereby making it difficult to store such bicycle carder anywhere other than on the floor or another low spot.

What is needed is an apparatus, system, and method that facilitate use of a hitch-mounted bicycle carrier (or a carder for items other than bicycles) for off-vehicle bicycle storage, e.g., in a garage, and that further facilitate such storage in a convenient location, e.g., raised off of the ground.

For the sake of clarity, it is re-emphasized here that the disclosure herein is not limited to bicycles and/or bicycle carriers, but includes within its scope any carrier system for transporting items on a vehicle.

BRIEF SUMMARY OF THE INVENTION

In one embodiment, a Carrier Storage System may comprise a vertically oriented and secured track and trolley. The trolley may comprise wheels for guiding the trolley along the track. The Carrier Storage System may further comprise a mechanism for raising and lowering the trolley along the track. In one embodiment, the mechanism for raising and lowering the trolley may comprise a winch, attached by a cable to the trolley, where the winch retracts and deploys releases the cable to raise and lower the trolley. A hitch adapter may be secured to the trolley, or may be a monolithic part of the trolley.

A bicycle carrier may be removably secured to the hitch adapter, and may thereby be raised and lowered by retracting or deploying cable from the winch. Using the disclosed apparatus, bicycles secured to the bicycle carrier may be stored and may be raised or lowered by raising or lowering the trolley.

DETAILED DESCRIPTION OF THE INVENTION

Table of Reference Numbers from Drawings:

The following table is for convenience only, and should not be construed to supersede any potentially inconsistent disclosure herein.

| Reference Number | Description |
| --- | --- |
| 100 | Carrier Storage System |
| 110 | track |
| 112a | lower track segment |
| 112b | upper track segment |
| 112n | track segment. |
| 114 | left rail |
| 117 | right rail |
| 120 | left connector bracket |
| 121 | right connector bracket |
| 122a-f | wall mount strips |
| 122n | exemplary wall mount strip |
| 123a-f | left rail mounting slots |
| 123n | exemplary left rail mounting slot |
| 124a-f | right rail mounting slots |
| 124n | exemplary right rail mounting slot |
| 130 | trolley |
| 131 | trolley chassis |
| 132a | rail adapter |
| 132b | rail adapter |
| 133a-d | roller securement holes |
| 134 | hitch receiver |
| 135 | pulley adapter |
| 136a-d | roller assemblies |
| 136a.1-d.1 | bolts |
| 136a.2-d.2 | roller bearings |
| 136a.3-d.3 | rollers |
| 137a-d | reinforcement plates |
| 138a-d | weld nuts |
| 142a | left securement pin hole |
| 142b | right securement pin hole |
| 160 | motor system |
| 165 | motor system plate |
| 166a | reinforcement plate for motor system plate |
| 166b | reinforcement plate for motor system plate |
| 170 | cable |
| 300 | exemplary bicycle carrier |
| 305a | left securement pin hole |
| 305b | right securement pin hole |
| 390 | insertion guide arrow |

A system, apparatus, and method are disclosed for facilitating use of a vehicle-mounted carrier system for off-vehicle storage, and further for off-vehicle storage in a convenient location, e.g., raised off of the ground. The apparatus disclosed herein may be referred to as a "Storage Adapter System for Hitch-Mounted Carrier," or, for short, a "Carrier Storage System."

In one embodiment a Carrier Storage System may comprise a vertically oriented and secured (or substantially vertically oriented and secured) track and trolley, as well as mechanism for raising and lowering the trolley along the track, and for securing the trolley at a position along the track. The trolley may include wheels or another mechanism for movement along the track. The trolley may further include a horizontally oriented female hitch receiver that mimics the orientation of a hitch receiver on a vehicle. The Carrier Storage System may further include a winch or other motorized or powered mechanism that deploys or retracts a cable, which is secured to the trolley, and thereby raises or lowers the trolley along the tracks. A bicycle carrier may be secured to the trolley. When the bicycle carrier is secured to the trolley, the bicycle carrier is raised and lowered as the trolley is raised and lowered.

Figure 1:
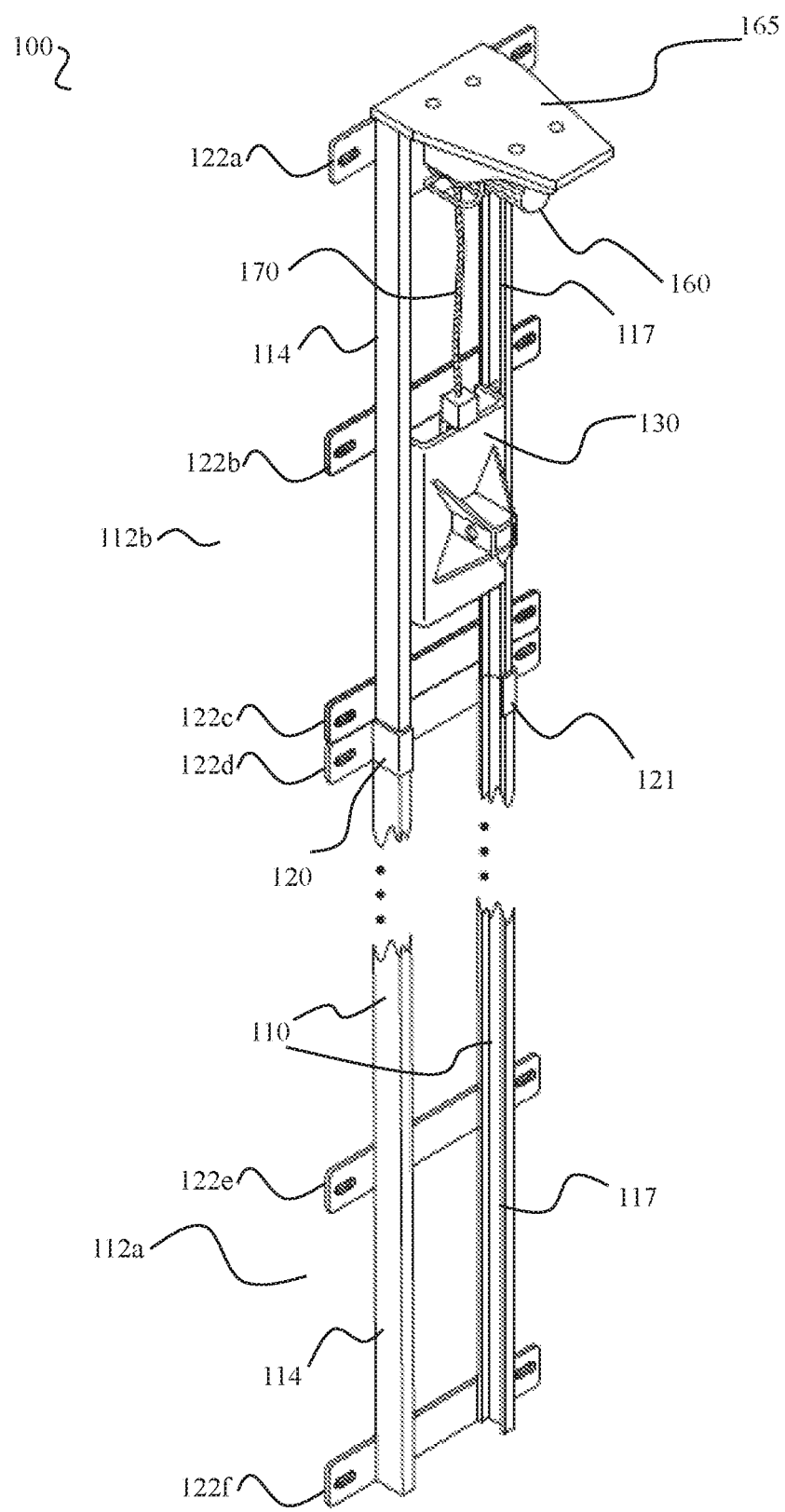
FIG. 1 shows an exemplary embodiment of the Carrier Storage System as disclosed herein.

FIG. 1 shows an exemplary Carrier Storage System 100. As shown in FIG. 1, Carrier Storage System may comprise track 110, trolley 130, and motor system 160. In general, motor system 160, which may comprise a winch or other motor, may be secured to motor system plate 165, and may be configured to deploy and retract cable 170, which may be secured to trolley 130. When motor system 160 deploys cable 170, gravity pulls trolley 130 downward. When motor system 160 retracts cable 170, trolley 130 is pulled upward. In this manner, trolley 130 may be lowered or raised. If bicycle carrier 300 is secured to trolley 130 as shown in FIGS. 2a and 2b, then bicycle carrier 300 is lowered or raised with trolley 130.

Figure 2A:
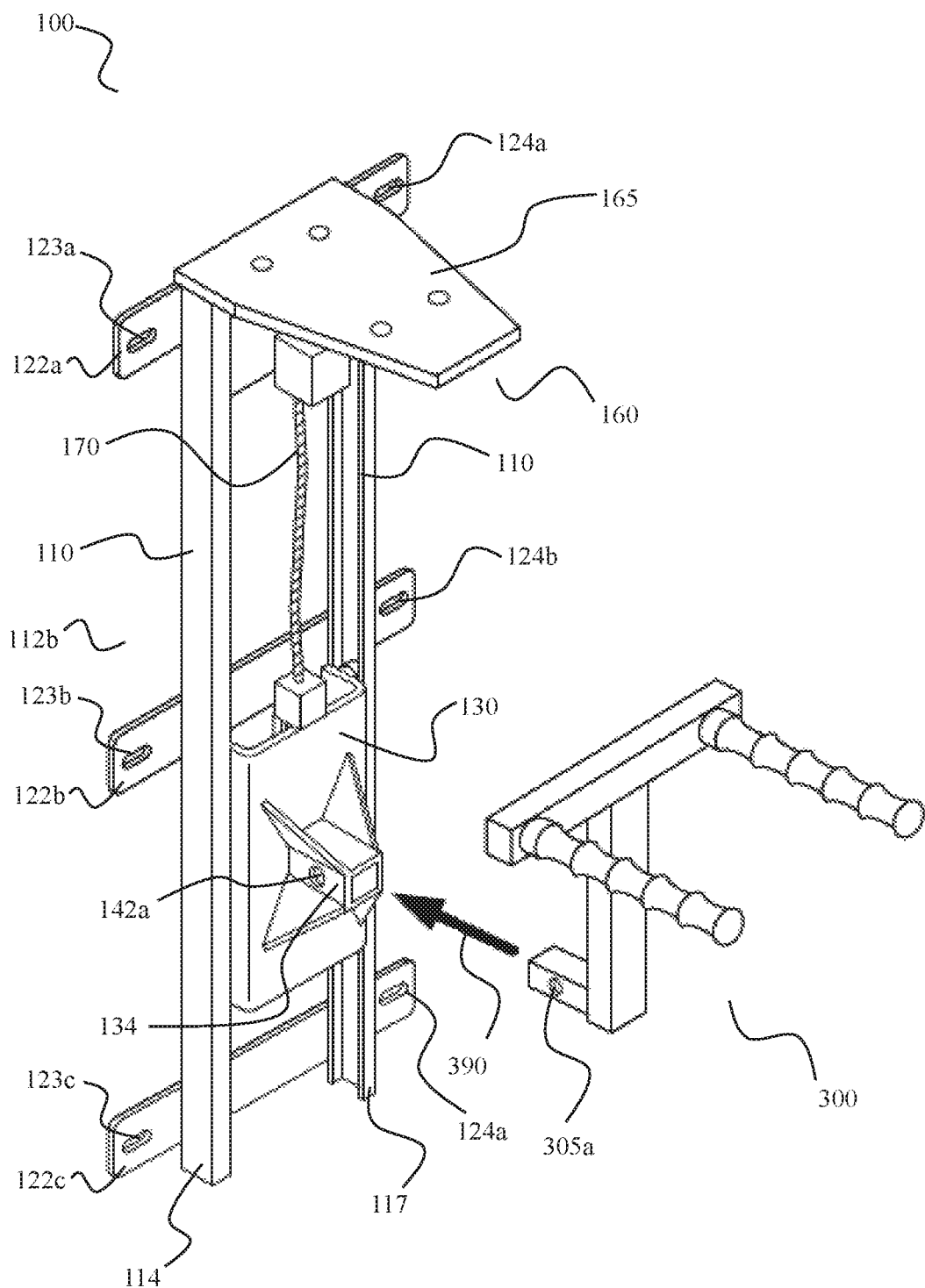
FIG. 2a shows an exemplary embodiment of a Carrier Storage System and a bicycle carrier.
Figure 2B:
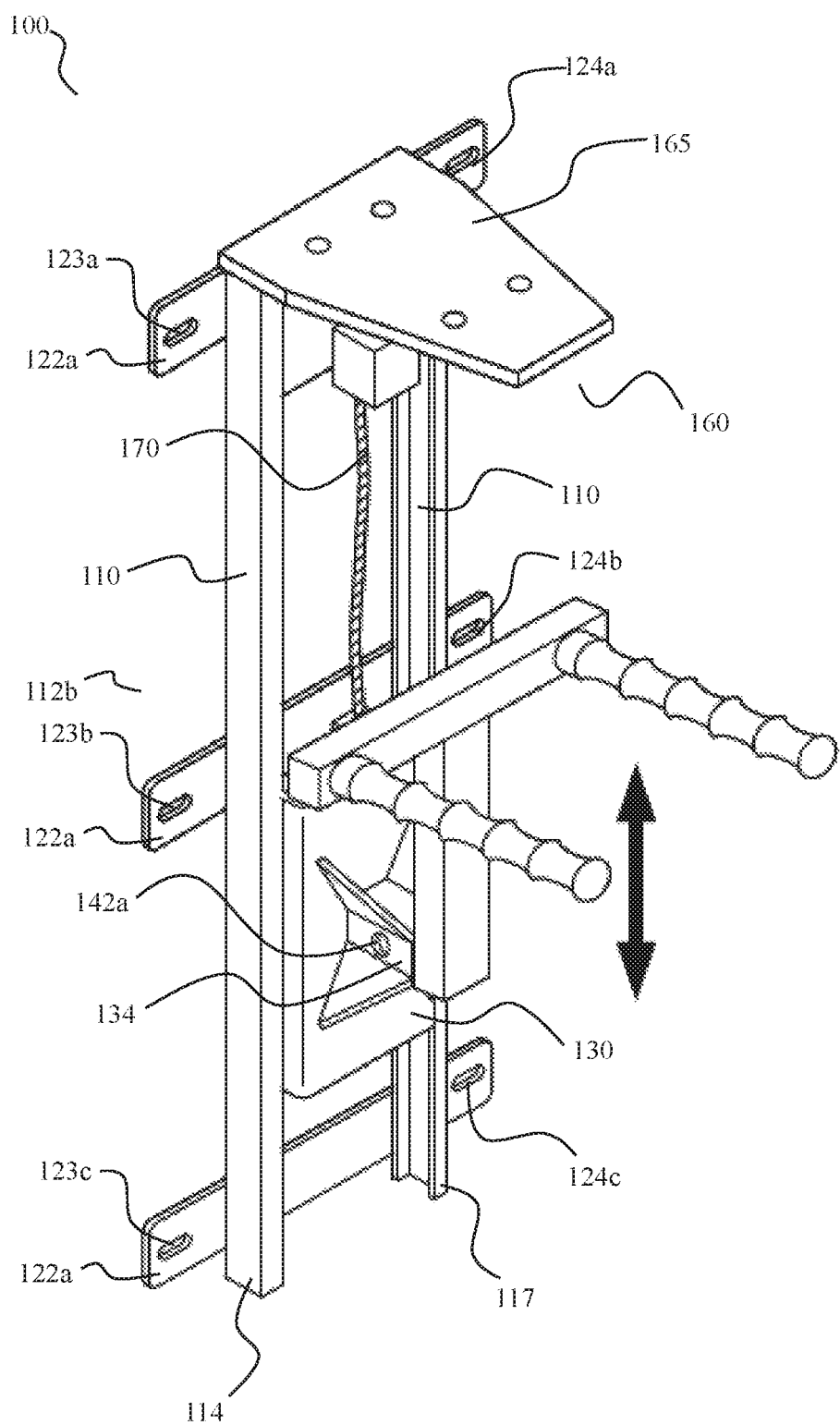
FIG. 2b shows an exemplary embodiment of a Carrier Storage System and a bicycle carrier secured to the trolley of the Carrier Storage System.

FIGS. 2a and 2b show Carrier Storage System 100 in use with exemplary bicycle carrier 300. FIG. 2a a shows Carrier Storage System 100 in a partially lowered configuration, e.g., with cable 170 partially deployed from motor system 160. Insertion guide arrow 390 shows how bicycle carrier 300 may be inserted into hitch receiver 134 on trolley 130.

FIG. 2b shows bicycle carrier 300 in an inserted configuration, i.e., with bicycle carrier 300 inserted into hitch receiver 134. Although not shown in FIGS. 2a and 2b, in one embodiment bicycle carrier 300 may be secured to hitch receiver 134 by inserting a pin through the holes in the sidewalls of hitch receiver 134 and through the sidewalls of bicycle carrier 300, e.g., through securement holes 142a, 305a, 305b, and 142b. In one embodiment, as is well known in the art, and pin and clip mechanism may be used as the pin.

Rail System

Figure 3:
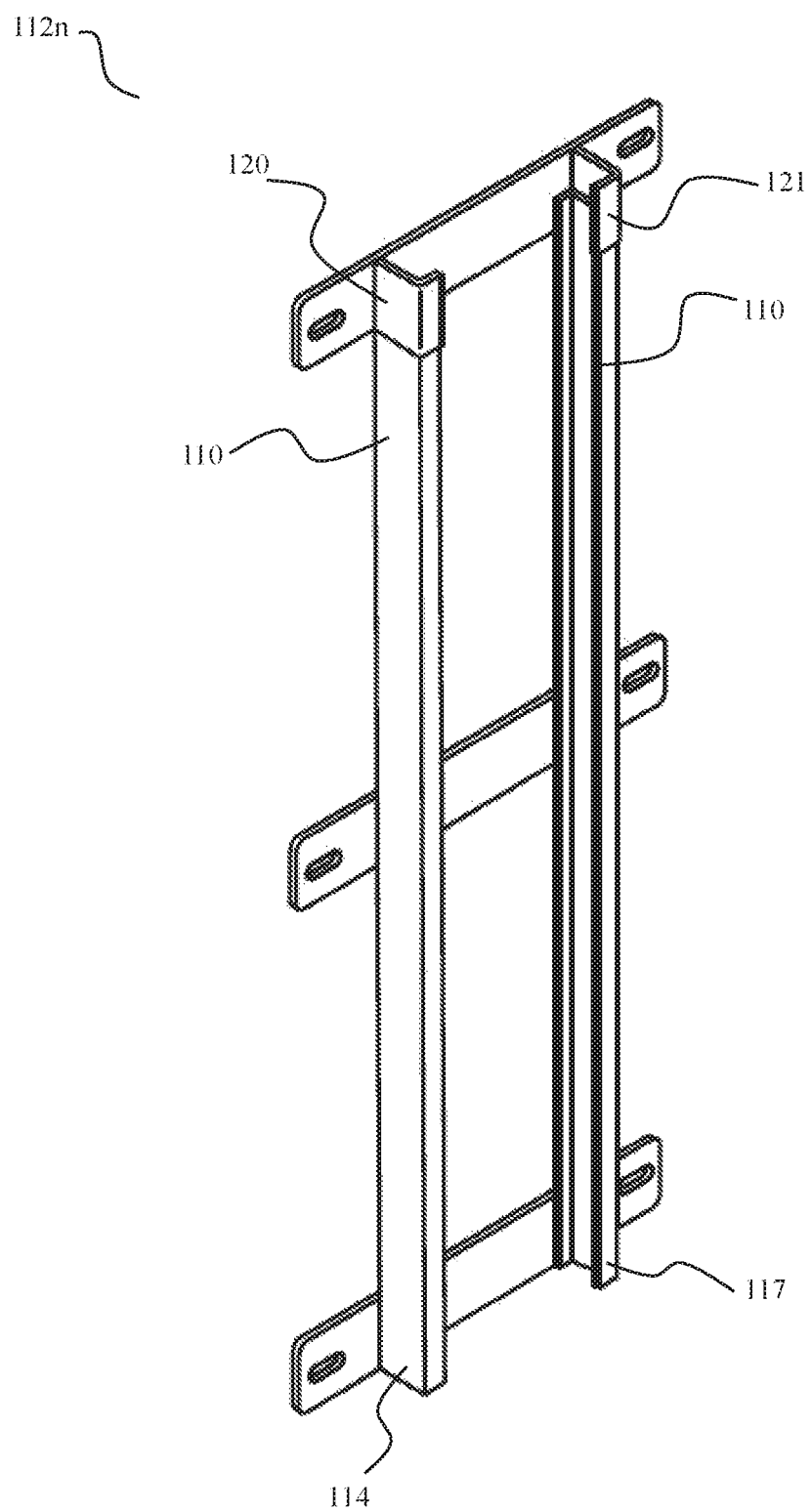
FIG. 3 shows a close-up view of an exemplary track segment.
Figure 4A:
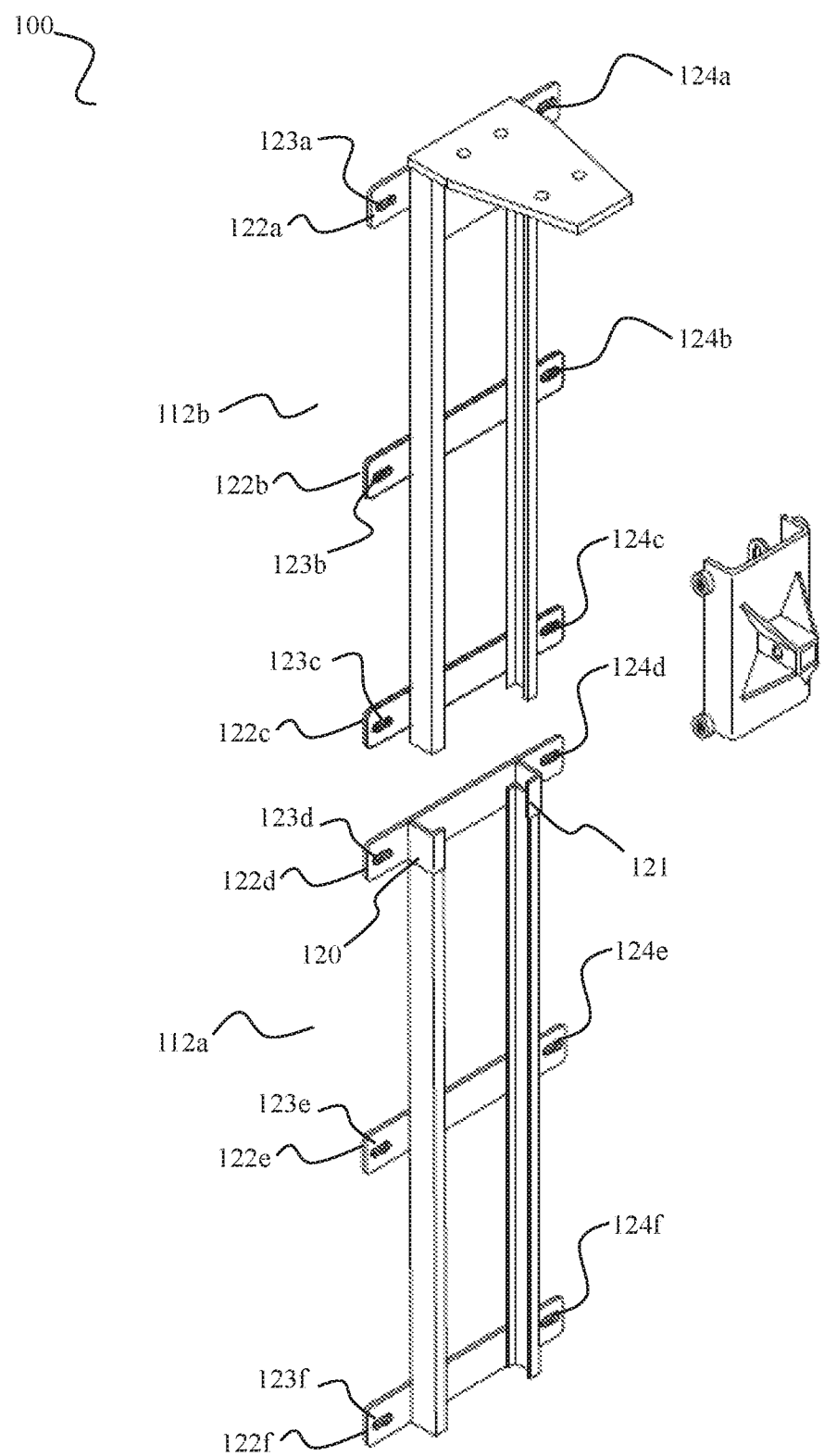
FIG. 4a shows an exemplary Carrier Storage System comprising two track segments.

As shown in FIG. 1, Carrier Storage System may comprise one or more track segments 112a, 112b, ... 112n. FIG. 4a shows an exemplary Carrier Storage System 100 comprising two track segments 112a and 112b. FIG. 3 shows a close-up view of an exemplary track segment 112n.

Using multiple segments may have several advantages. First, track 110 may be smaller and more compact, and thereby more convenient for storage, shipping, packaging, and/or transportation if it can be broken down or disassembled into multiple shorter segments. Second, using multiple segments may allow the track length or size to be scalable and easily customizable by using more or fewer rack segments depending on the features (e.g., wall height) of a particular installation. Third, using multiple segments may allow for inserting trolley 130 into track 110 during installation, e.g., while segments are still separate, or while at least one segment remains to be installed. In this manner, the trolley may be effectively locked into track 110 when all segments have been installed. This may be a safety feature to decrease the likelihood that trolley 130 will separate from or fall out of track 110. In other embodiments, it may be possible to insert trotley 130 into track 110 without a break between segments, e.g., by inserting trolley 130 into track 110 through openings in the bottom or top of track 110, or by using a hinged folding or collapsing mechanism in trolley 130 or track 110 so that track rails or trolley components may be temporarily displaced to allow for insertion of trolley 130 into track 110. In such an embodiment, track 110 may subsequently be returned to a non-collapsed configuration, and may be locked in such a configuration, e.g., by a pin.

In other embodiments, track 110 may comprise only one segment.

In one embodiment, track 110 may comprise two rails 114 and 117 that run in parallel in the same plane, and are oriented vertically. Although such characterization is arbitrary, for the sake of convenience in described Carrier Storage System 100, rail 114 is referred to herein as the left rail, and rail 117 will be referred to herein as the right rail.

Rails 114 and 117 may be secured in a parallel coplanar configuration using wall mount strips 122a-f, which are shown in FIGS. 1, 2a, 2b, 4a, 4b, 5.

In one embodiment, each of wall mount strips 122a-f may be made from a metal or metal alloy such as steel or aluminum, or may be made of another sturdy and rigid material as may be known in the art. Each of wall mount strips 122a-f may be 20.0 inches long, 3.00 inches tall, and have a thickness of 0.188 inches. These dimensions are exemplary only and may be modified and/or scaled without departing from the spirit of this disclosure.

Wall strips 122a-f may each contain mounting slots 123a-f and 124a-f, which may extend through the entire thickness of each of wall strips 122a-f. Although shown in FIGS. 1-5 as being rectangularly shaped with circular ends, mounting slots 123a-f and 124a-f may have many shapes and remain with the scope of this disclosure. Mounting slots 123a-f and 124a-f may be used for securing wall mount strips 122a-f to a wall using screws (with or without washers) or other securing hardware inserted through mounting slots 123a-f and 124a-f and into a wall. The width of each of mounting slots 123a-f and 124a-4 may be approximately 2.50 inches, and the height may be approximately 0.25 inches.

Wall mount strips 122a-f may be secured to rails 114 and 117 by welding, by mechanical means such as bolts and nuts, or by any other securement solution known in the art. In the embodiment(s) shown in FIG. 14, wall mount strips 122a-f may be welded to rails 114 and 117.

In one embodiment, each of segments 112a and 112b may be approximately 46.0" tall, from the bottoms of the rails to the tops of the rails.

Rails 114 and 117 may be U-shaped (i.e., as a square "U") and may secured to mounting strips 122a-f so that the openings in the U-shape are directed inward toward each other, i.e., toward the other rail. In one embodiment, rails 114 and 117 may be made out of a metal or metal alloy such as steel or aluminum, or from any other material or composite that is rigid, durable, and strong. Rails 114 and 117 may be shaped other than as squares and still remain with the scope of this disclosure by being configured to provide a track for trolley 130.

Rails 114 and 117 may be approximately 2.0 inches wide and 2.00 inches deep, with a wall thickness of approximately 0.14 inches. These dimensions are merely exemplary, and may be scaled or otherwise altered for different applications.

As shown in FIGS. 1, 3, 4a, and 4b, rail segments may connect using connector brackets 120 and 121, which may be included on any rail segment to which another rail segment may be connected. Connector brackets 120 and 121 may be L-shaped brackets that track the outer and front surfaces of rails 114 and 117, respectively, but which extend past the end of rails 114 and 117, thereby forming, on each of rails 114 and 117, a two-sided guide sleeve into which the corresponding rails form another segment may be inserted.

Figure 4B:
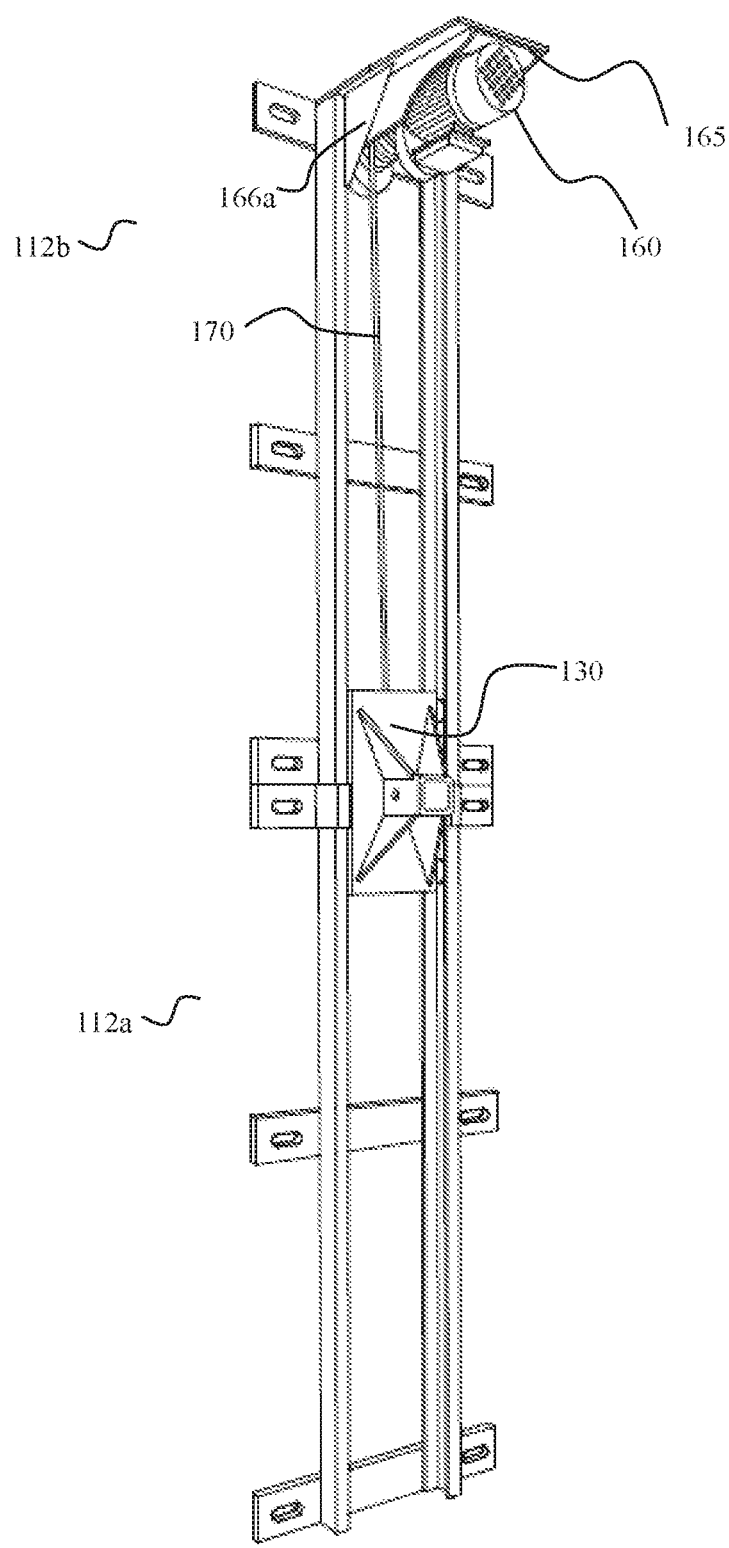
FIG. 4b shows an exemplary Carrier Storage System comprising two track segments, and including a winch secured near the top of the Carrier Storage System.
Figure 5:
FIG. 5 shows an exemplary wall mount strip.

In one embodiment, as shown for example in FIGS. 1, 4a, and 4b, two rail segments 112a and 112b may be connected by securing first rail segment 112a to a wall, wherein first rail segment 112a may have connector brackets 120 and 121 on the upper ends of its rails, and wherein first rail segment 112a will be the lower rail segment, and from above first rail segment 112a inserting and aligning a second rail segment 112b into connector brackets 120 and 121 for lower rail segment 112a, and then securing second rail segment 112b into place the using wall mount strips 122a-c for second rail segment 112b.

In one embodiment, connector brackets 120 and 121 may be secured to rails 114 and 117, and/or to wall mount strip 122c, by welding, by being manufactured monolithically, by other mechanical means, or by any other means known in the art.

A person of ordinary skill will appreciate that many approaches other than those specifically described herein could be used for connecting and/or aligning track segments 112a and 112b, For example, if both of track segments 112a an 112b are securely and precisely positioned and secured to a wall, then connector brackets may be unnecessary. Many other variants using may types of hardware may be employed to connect and/or align track segments 112a and 112b, and remain within the scope and spirit of this disclosure herein.

A person of ordinary skill will recognize that based on rigidity, strength, and size of left rail 114 and right rail 117, a greater or smaller number of wall mount strips 122a-f may be necessary to make track 110 sufficiently strong and to maintain distance and position between left rail 114 and right rail 117.

A person of ordinary skill will further appreciate that other rail systems could be used, with modifications that are within the scope of the disclosure here, to accomplish a similar result. For example, a monorail system, or a three rail system, or one of many other kinds of systems could be used with a trolley adapted to the such rail, and still remain within the scope of the disclosure herein.

Trolley

Figure 6A:
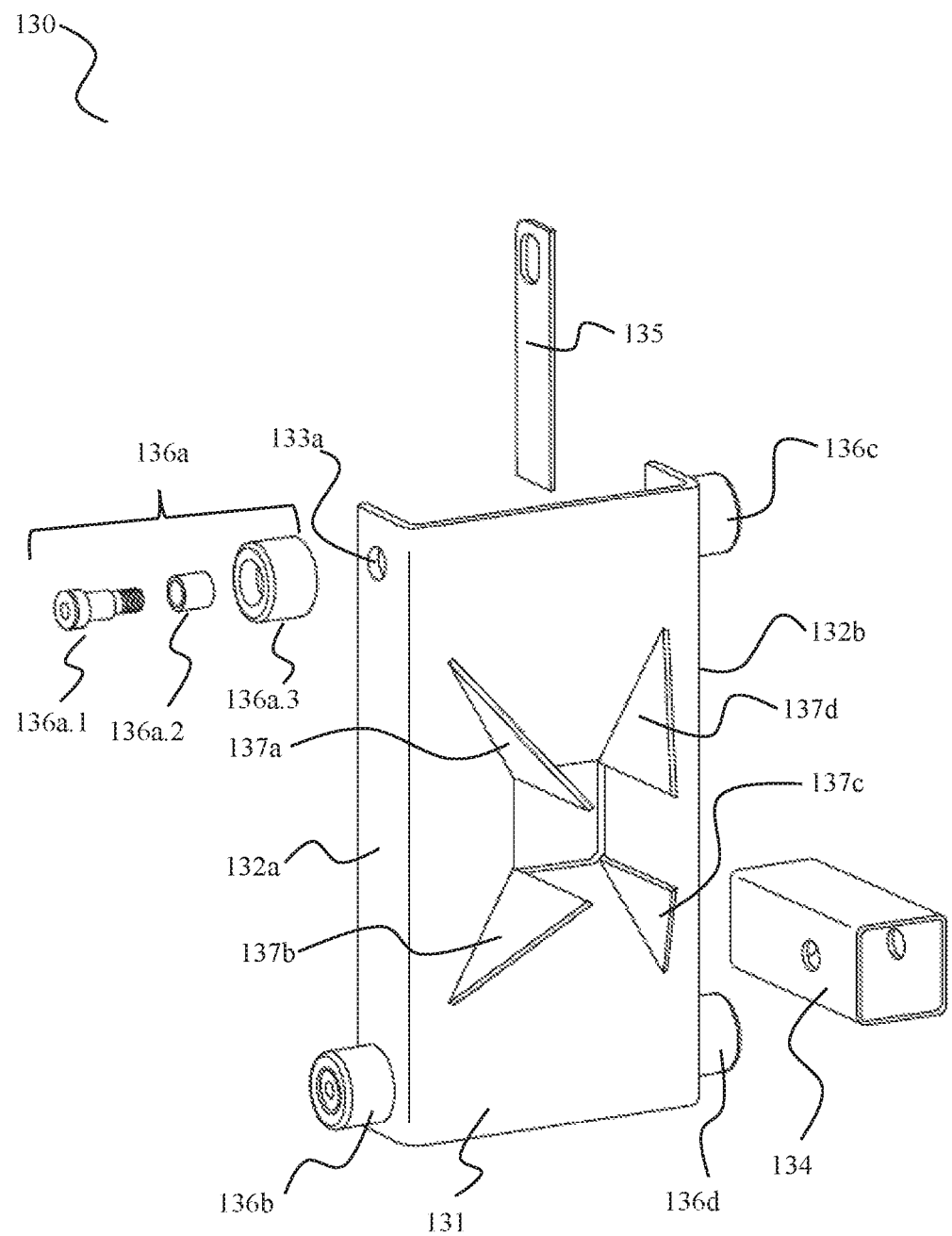
FIG. 6a shows a partially exploded view of an exemplary trolley.
Figure 6B:
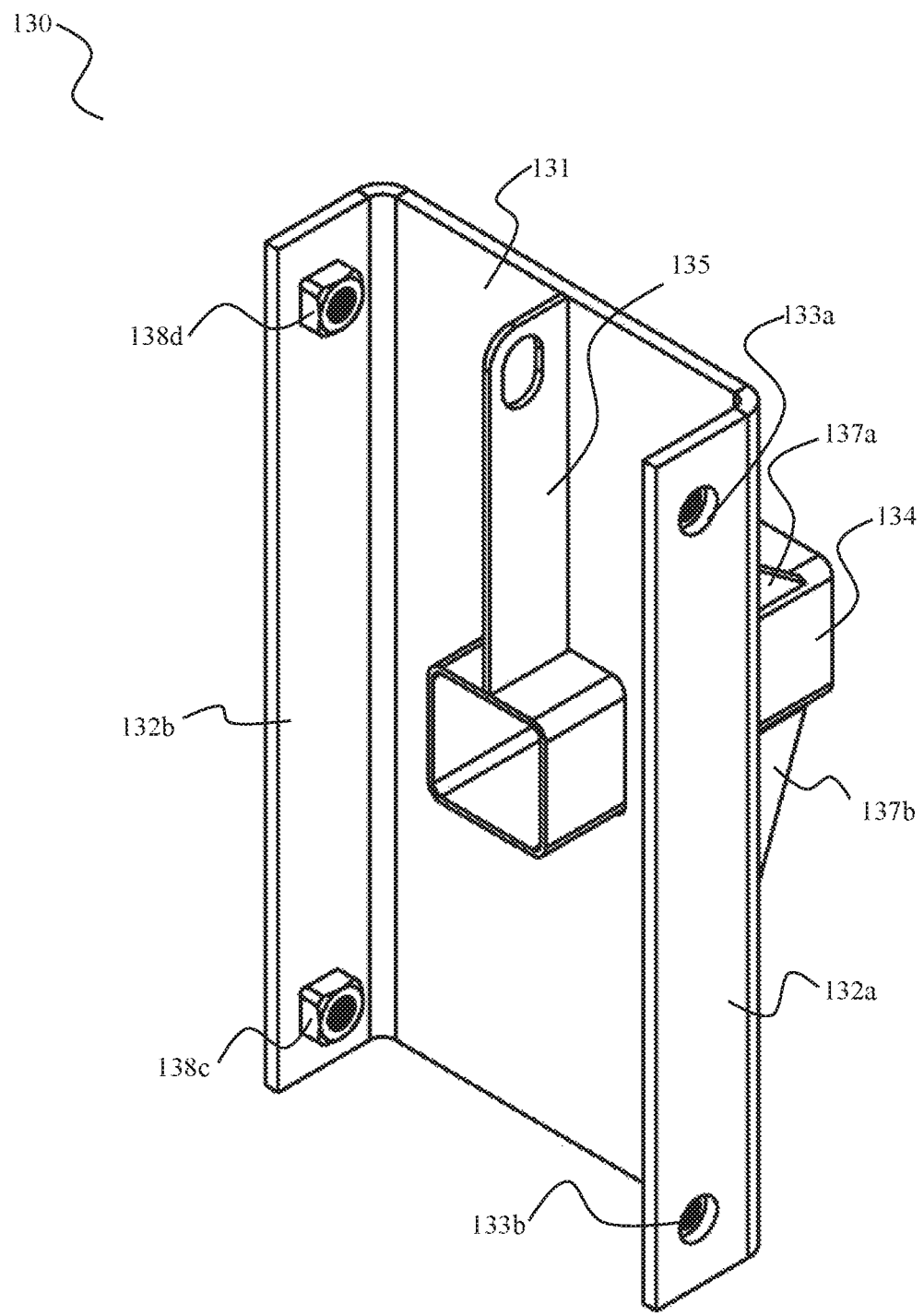
FIG. 6b shows a rear-elevated view of an exemplary trolley.
Figure 6C:
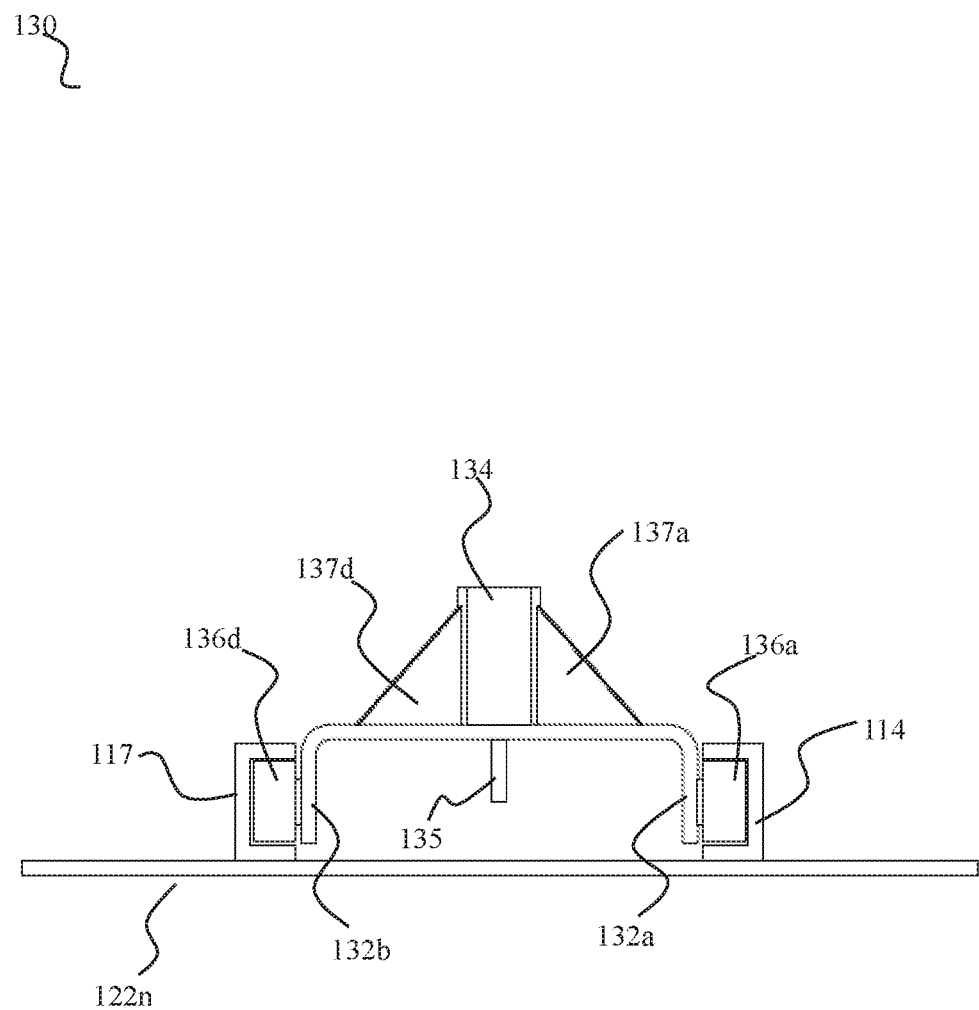
FIG. 6c shows a top view of an exemplary trolley.

FIGS. 6a, 6b, and 6c show a front angle view, rear angle view, and top view of exemplary trolley 130. A person of ordinary skill will appreciate that trolley 130 is exemplary, and many modifications and adaptations may be made and still be within the spirit and scope of the disclosure herein.

Trolley 130 may comprise trolley chassis 131, rail adapters 132a and 132b, roller securement holes 133a-d, roller assemblies 136a-d, hitch receiver 134, pulley adapter 135, and reinforcement plates 137a-d.

In one embodiment, trolley 130 may be fully or partially monolithic, i.e., some or all of the components identified above of trolley 130 may be formed of the same material. In another embodiment, some or all of the components of trolley 130 may be secured to each other using welding, hardware (e.g., screws, nuts, and bolts), adhesives, or other methods known in the art.

The dimensions of trolley 130 may be such that trolley 130 is complementary to and fits on track 110 and rails 114 and 117 as shown in FIGS. 1-4.

FIG. 6a shows a partially exploded view of trolley 130, wherein pulley adapter 135, hitch receiver 134, and roller assembly 136a are shown in an exploded arrangement.

As shown in FIGS. 6a-c, roller assemblies are secured to trolley 130 via rail adapters 132a-b by inserting bolts 131a.1-d.1 through roller bearings 136a.2-d.2 and wheels 136a.3-d.3, respectively, from the outside of rail adapters 132a-b, through roller securement holes 133a-d, and by threading bolts 136a.1-d.1 into nuts 138a-d. As will be appreciated by one of skill, in one embodiment nuts 139a-d may be square weld nuts. The square shaping may keep the nut from turning (because the side/corner of the nut may be obstructed from turning by trolley chassis 131.

A person of ordinary skill will appreciate that many approaches, which are within the spirit and scope of this disclosure, may be applied for adapting trolley 130 to run along track 110. For example, wheels on trolley 130 may be placed in various locations on trolley 130, and may be oriented in different directions relative to trolley 130 and track 110, and track 110 may be adapted such that rail adapters are configured and oriented to be complementary to and receive wheels or similar components secured to or otherwise part of trolley 130.

A person of ordinary skill will further appreciate that many other guide systems, and variations on guide systems, may be employed to guide trolley 130 upward as disclosed herein.

Motor/Pulley System

In one embodiment, Carrier Storage System may include a pulley system for raising and lowering trolley 130. In one embodiment, pulley system may be motorized.

FIGS. 1, 2a, 2b, and 4b show an exemplary pulley system comprising motor system 160, motor system plate 165, and cable 170. Motor system 160 may comprise a motor, such as a winch, which may be secured such that winch 160 deploys cable 170 from a point that is substantially above pulley adapter 135 on trolley 130. Winch 160 may be connected to a power supply, e.g., by a power cord plugged into an outlet in a wall or in any other power supply configuration or solution.

In one embodiment, motor 160 may be secured to the underside of plate motor system plate 165, e.g., using nuts and bolts. As shown in FIGS. 1, 2a, 2b, 4a, and 4b, motor plate may be secured to upper track segment 112b, e.g., by welding, hardware, or possible even as a monolithic part of upper track segment 112b. As shown in FIG. 4b, Carrier Storage System 100 may include reinforcement plates 166a and 166b to support and reinforce motor plate 165.

Motor 160 may be secured in many other ways, e.g., by being secured to a wall such that motor 160 is not secured to Carrier Storage System 100 other than via cable 170, or by being secured to a ceiling such that motor 160 is not secured to Carrier Storage System 100 other than via cable 170. In another embodiment, motor 160 may mounted in low position, e.g., toward the bottom of Carrier Storage System 100, and a pulley system may be used to pull trolley 130 upward.

The end of cable 170 may be secured through hole in pulley adapter (as shown in FIGS. 6a and 6b) in any way known in the art for securing cables, e.g., a hardware piece such as a crimping sleeve, wire rope clamp, or wire rope clip, or one of many other approaches known in the art for securing cable, or wire rope, or similar items.

When winch 160 is actuated to deploy cable 170, gravity causes trolley 130 to move downward. When winch 160 is actuated in the opposite direction, i.e., to retract cable 170, then cable 170 pulls trolley 130 upward toward winch 160.

Motor 160 may be actuated through a switch on the motor itself a wired remote, a wireless remote, a wall switch (running wiring from motor 160 to the switch), wireless technology such as Bluetooth, or via any other control scheme or technology known in the art.

The control system for Carrier Storage System 100 may further include preset configuration, such as an up position, or a down position, or a position at a predetermined height.

In one embodiment, winch 160 may be configured to stop when a particular length of cable has been deployed, or lower track segment 112a may include hardware or some other apparatus to stop trolley from traveling too far if too much cable is deployed.

Use

In general, Carrier Storage system 100 is used by installing in a vertical configuration, lowering trolley 103, securing exemplary bicycle carrier 300 by inserting bicycle carrier 300 into hitch receiver 134, and then inserting and securing a pin and clip through holes 142a, 305a, 305b, and 142b in hitch receiver 134 and exemplary bicycle carrier 300.

Once exemplary bicycle carrier 300 is secured to trolley 130, motor system 160 may be used to raise or lower trolley 130 and bicycle carrier 300. Bicycles or other items may be placed on, secured to, hung from, or removed from bicycle carrier 300.

In one embodiment, Carrier Storage System 100 may be used to store bicycles when not in use and to allow for use of bicycle carrier 300 on a vehicle to transport bicycles when in use. For example, Carrier Storage System 100 may initially be in a raised position, with bicycle carrier 300 secured to trolley 130, and one or more bicycles secured or attached to bicycle carrier 300. Motor 160 may be actuated to deploy cable 170, thereby lowering trolley 130 and bicycle carrier 300. At this point bicycles may be removed from bicycle carrier 300. With bicycles removed, bicycle carrier 300 may be unsecured from trolley 130 and removed from hitch receiver 134. Bicycle carrier 300 may then be secured to a hitch receiver on a vehicle, and bicycles may be secured to bicycle carrier 300.

The bicycles and bicycle carrier 300 may be returned to Carrier Storage System 100 by reversing the above steps.

A person of ordinary skill will appreciate that, in general, the dimensions, sizes, and lengths disclosed herein are exemplary only and may be modified and/or scaled without departing from the spirit of this disclosure.

What is claimed is:

1. A surface mounted lifting and lowering system for a hitch attached carrier, comprising:
   a trolley with a hitch adapter;
   a track configured to guide the trolley, wherein the track is substantially vertically oriented,
   a trolley movement system configured to move the trolley along the track; and
   means for mounting the track on a vertical surface;
   wherein:
   the track is substantially vertically oriented;
   the track comprises a left U-channel comprising a front, side, a back side, and a bottom;
   the track comprises a right U-channel comprising a front side, a back side, and a bottom;
   the track comprises at least one connector bracket secured to the left U-channel;
   the track comprises at least one connector bracket secured to the right U-channel;
   the track comprises a plurality of wall mount strips
   the left connector bracket is connected to the left U-channel and the right connector bracket is connected to the right U-channel;
   the system further comprises winch-mounting hardware;
   the left U-channel and the right U-channel are parallel to each other;
   the left U-channel opens toward the right U-channel;
   the right U-channel opens toward the left U-channel;
   the trolley comprises two left wheels, each configured to interface with the front, side of the left U-channel and the back side of the left U-channel;

the trolley comprises two right wheels, each configured to interface with the front side of the right U-channel and the back side of the right U-channel; and the trolley movement system comprises a motor-driven winch mounted on the winch-mounting hardware and configured to deploy and retract a cable secured to the trolley, thereby raising the trolley when retracted and lowering the trolley when deployed.

* * * * *